United States Patent
Fritz

(10) Patent No.: US 6,757,679 B1
(45) Date of Patent: Jun. 29, 2004

(54) SYSTEM FOR BUILDING ELECTRONIC QUEUE(S) UTILIZING SELF ORGANIZING UNITS IN PARALLEL TO PERMIT CONCURRENT QUEUE ADD AND REMOVE OPERATIONS

(75) Inventor: Rolf Fritz, Waldenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/568,711

(22) Filed: May 11, 2000

(30) Foreign Application Priority Data

Jun. 25, 1999 (EP) .......................... 99112216

(51) Int. Cl.[7] ............................. G06F 17/30
(52) U.S. Cl. .................... 707/8; 707/100; 711/118; 711/133; 711/158; 711/167; 710/39; 710/54; 712/11; 365/49; 370/412; 709/224; 709/226
(58) Field of Search .................... 710/52–53, 54–57, 710/112, 310, 39; 709/104, 203–226; 370/413, 217, 412, 415–417; 711/117–118, 141–143, 146, 133, 158, 167; 707/1–10, 100–104.1, 202–206; 712/11; 365/49

(56) References Cited

U.S. PATENT DOCUMENTS

| | | | | |
|---|---|---|---|---|
| 5,278,828 A | * | 1/1994 | Chao | 370/394 |
| 5,515,428 A | * | 5/1996 | Sestak et al. | 379/266.01 |
| 5,541,912 A | * | 7/1996 | Choudhury et al. | 370/412 |
| 5,625,778 A | * | 4/1997 | Childers et al. | 710/107 |
| 5,644,754 A | | 7/1997 | Weber et al. | 703/24 |
| 5,754,811 A | * | 5/1998 | Putrino et al. | 712/214 |
| 5,781,182 A | * | 7/1998 | Liu et al. | 345/560 |
| 5,805,589 A | * | 9/1998 | Hochschild et al. | 370/389 |
| 5,838,915 A | * | 11/1998 | Klausmeier et al. | 709/215 |
| 5,873,089 A | * | 2/1999 | Regache | 707/100 |
| 5,905,876 A | * | 5/1999 | Pawlowski et al. | 710/112 |
| 5,996,019 A | * | 11/1999 | Hauser et al. | 370/429 |
| 6,044,418 A | * | 3/2000 | Muller | 710/39 |
| 6,044,435 A | * | 3/2000 | Weissmann | 711/111 |
| 6,145,061 A | * | 11/2000 | Garcia et al. | 711/154 |
| 6,167,054 A | * | 12/2000 | Simmons et al. | 370/412 |
| 6,219,728 B1 | * | 4/2001 | Yin | 710/52 |
| 6,223,205 B1 | * | 4/2001 | Harchol-Balter et al. | 709/102 |
| 6,295,586 B1 | * | 9/2001 | Novak et al. | 365/203 |
| 6,345,327 B1 | * | 2/2002 | Baskey et al. | 709/104 |
| 6,360,219 B1 | * | 3/2002 | Bretl et al. | 707/8 |

FOREIGN PATENT DOCUMENTS

| | | | | |
|---|---|---|---|---|
| EP | 0860775 A1 | * | 8/1998 | 9/46 |
| WO | WO 99/52321 | * | 10/1999 | 11/4 |

* cited by examiner

Primary Examiner—Srirama Channavajjala
(74) Attorney, Agent, or Firm—Scully, Scott, Murphy & Presser; Richard M. Ludwin, Esq.

(57) ABSTRACT

An electronic queue management system for implementation on a chip. The queue management system comprises a plurality of primitive queue elements each including a register for a next-pointer and a register for a queue number. The next-pointer values may be selected via a register input and can be fed out via a registered output. Such queue elements are associated with a respective entry in a central array which stores the data belonging to the actual request. The separation of the data array and queue elements facilitates queue management as the data amounts are quite large compared to the small amount of data being required for the pre logic of the queue management system. Multiple add requests and multiple remove requests operations for different queue elements may be concurrently achieved in a single cycle.

8 Claims, 8 Drawing Sheets

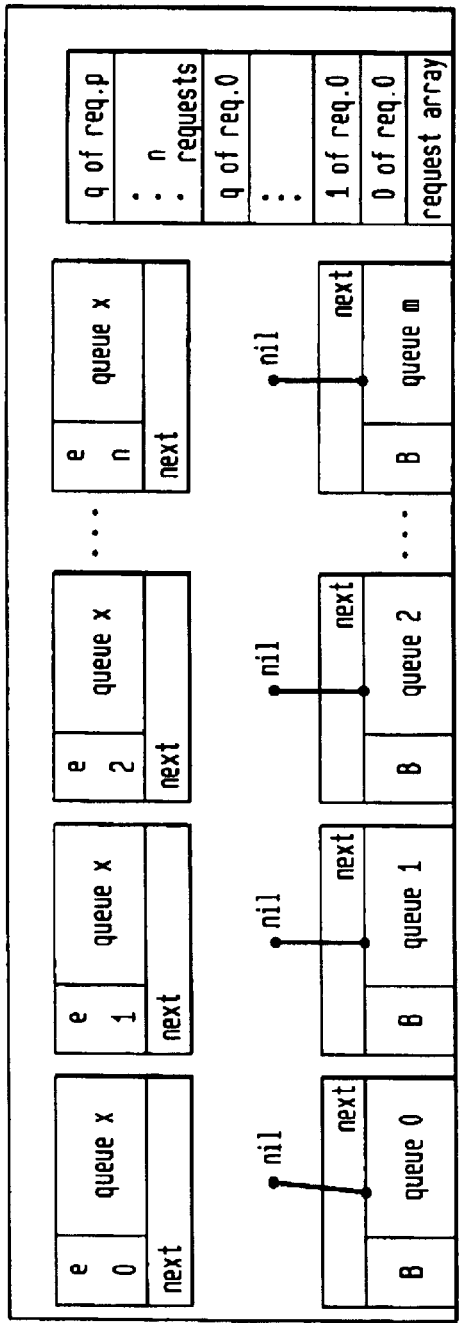
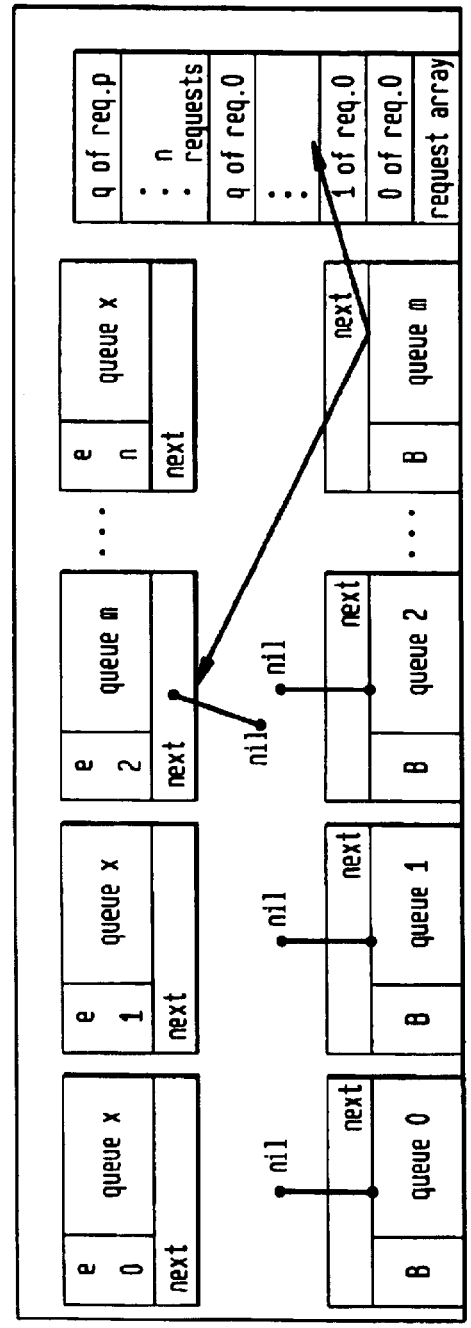
FIG. 3A
FIG. 3B

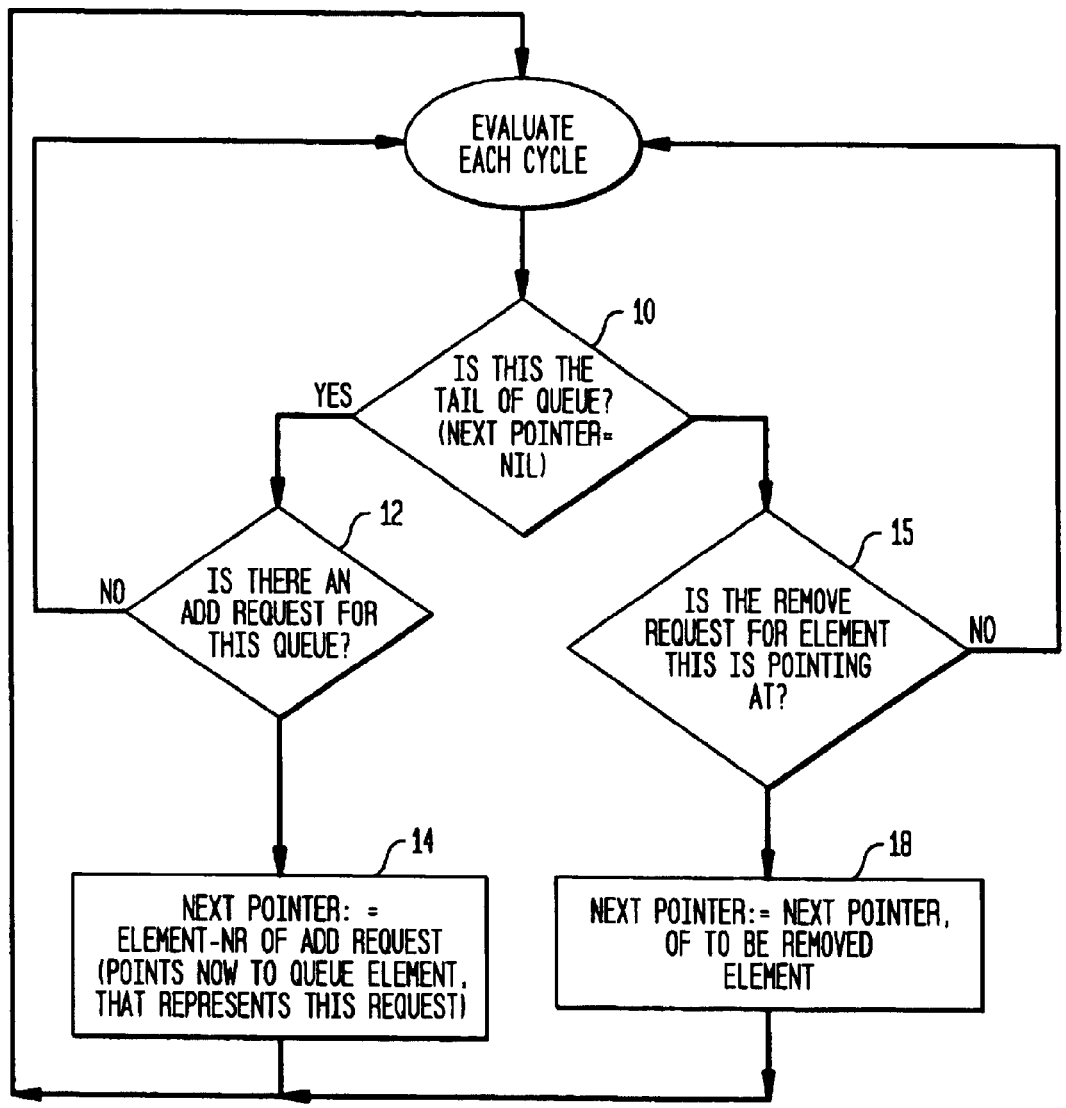

FLOWCHART FOR QUEUE ELEMENT WHEN ADDED
(CONCURRENTLY RUNNING IN EACH QUEUE ELEMENT)

SYSTEM FOR BUILDING ELECTRONIC QUEUE(S) UTILIZING SELF ORGANIZING UNITS IN PARALLEL TO PERMIT CONCURRENT QUEUE ADD AND REMOVE OPERATIONS

BACKGROUND OF THE INVENTION

1. Technical Field

The preset invention relates to electronic queue management systems. It relates in particular to a method and system for managing multiple requests sent by multiple requesters and to service by multiple resources each managed by a queue.

2. Prior Art

Often in electronic systems, requests sent by p requesters must be queued to m resources, which may be busy. In such a case these requests must be held represented in queues.

In general, queue management systems as disclosed in European patent application EP 654 740 are programs which are written in any programming language available according to prior art techniques. In C language such queues can be mapped to some kind of data structures called 'chain lists'.

A disadvantage of such an approach is, however, that when running such a program there is a central instance which has to reference long sequences of pointers before a particular pointer which is represented by some current request can be found. Thus, caused by that sequential nature of programming logic, such systems suffer from slow performance.

It is thus an object of the present invention to increase the access speed for accessing a particular queue element which has to be referenced by any request for a particular resource.

It is a further object of the present invention to provide for a hardware implementation of a queue management system in which such queues are implemented in a resource effective way, that allows for multiple adds and removes at a time.

SUMMARY OF THE INVENTION

In accordance with the principles of the invention there is provided an electronic queue management system for implementation on a chip. The queue management system comprises a plurality of primitive queue elements each including a register for a next-pointer and a register for a queue number. The next-pointer values may be selected via a register input and can be fed out via a register output. Such queue elements are associated with a respective entry in a central array which stores the data belonging to the actual requests. The separation of the data array and queue elements facilitates queue management as the data amounts are quite large compared to the small amount of data being required for the pure logic of the queue management system. Multiple add request and multiple remove request operations for different queue elements may be concurrently achieved in a single cycle.

The present invention is further directed to a computer comprising the electronic queue management system described above, as well as to an electronic circuit comprising said electronic queue management system.

BRIEF DESCRIPTION OF THE DRAWINGS

Preferred embodiments of the present invention will now be described, by way of example only, with reference to the accompanying drawings in which:

FIGS. 3A to 3E is each a schematic block diagram showing the processing of basic ADD/and Remove functions according to the present invention, and FIG. 3F is a flow chart depicting the functionality that is performed in each cycle and concurrently running in each base unit or in each queue element after having been added to a queue, for updating the next pointer.

DETAILED DESCRIPTION OF THE PREFERRED EMBODIMENTS OF THE INVENTION

Figure 1:
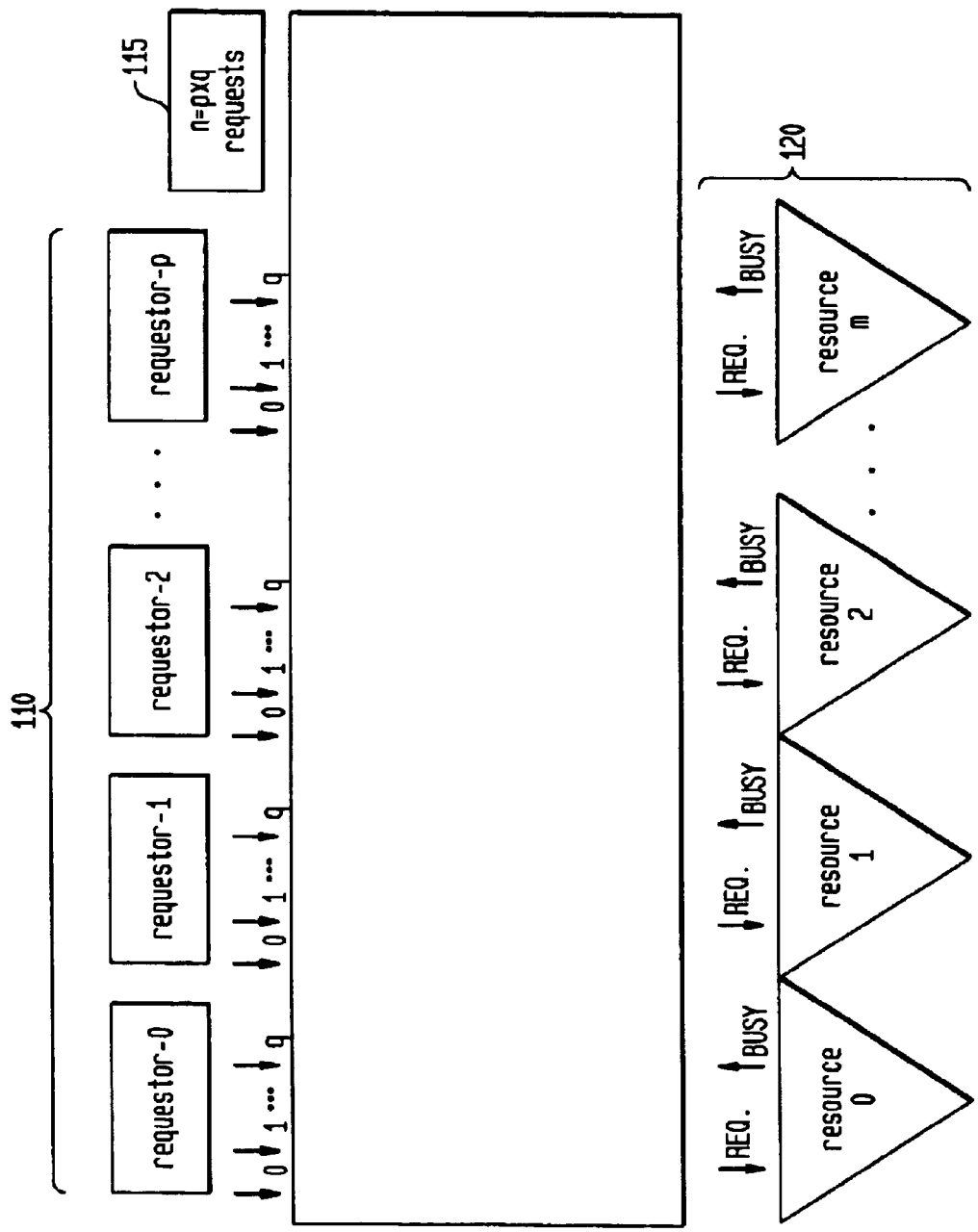
FIG. 1 is a schematic block diagram showing the general situation the present invention is confronted with, FIG. 2 is a schematic block diagram showing the basic elements of an inventional circuit representing a broad aspect of the present invention.

In most cases the maximum number of outstanding requests per requester o at a given time is limited, such that the total number of request at a given time is $n = o \times p$.

The basic idea comprised of the present invention is to provide a hardware implementation of such a queue management system on a chip.

According to an advantageous feature of the present invention such a queue management system can be realized by a plurality of primitive queue elements consisting each basically of a register for a next-pointer and a register for a queue number. The next-pointer values of the queue elements are available to each queue element as an input via a multiplexer and through a register.

Such queue elements are associated with an entry in a central array in which the data belonging to the actual requests are stored. This separation is advantageous as said data amounts are quite large compared to the small amount of data being required for the pure logic of the queue management system.

In said hardware implementation the queues consist of m so-called queue-base units representing the m top of queues and n so-called queue-elements representing the n requests. Each request, that may exist at a time must be associated with a queue-element, e.g., requesters a and b can both have two requests outstanding at a time. Then n is 4 and queue-elements 0 and 1 are responsible for the possible requests 0 and 1 from requester a and queue-elements 2 and 3 are responsible for the possible requests 0 and 1 from requester b. The logic for queue-base and queue-element are very similar. Each of the units maintains a so-called next-element, which is encoded, such that it is able to point to one of the n queue-elements plus a nil value to represent the end of a queue. The queue-base units have a fixed queue-nr assigned, whereas the queue-nr of a queue-element is variable. This queue-nr is encoded, such that it is able to represent the m queues.

Each queue-base unit and each queue-element unit has access to the add- and remove-input lines of the device implementing said queue management system. The condition, that a next-element of a queue-base unit is different from nil is signaled as the 'queue not empty' condition for the queue, that this queue-base unit represents (determined by the queue-nr assigned to this queue-base).

The next-element of a queue-base unit represents the 'top of queue element' of that queue determined by the queue-nr assigned to this queue-base.

A queue is formed, by a queue-base pointing with its next-element to the first element in the queue, which points to the 2nd next element and so forth until the last element of the queue that has a next-element value of nil. All queue elements of such a queue have the same queue-nr as the queue-base, where the chain started.

First, an Add operation will be described during which a particular request is added to a queue.

An Add triggers actions in two units at a time:

The queue-element to be added initializes itself. It sets its next-element to nil, thus becoming the n end of queue. Then, it sets its queue-nr to the queue number, that it now belongs to.

The unit, which is the current end of queue, sets its next_elem pointer to the element to be added. This can take place in either a queue-base or in a queue-element. A unit is the end of a particular queue, if its queue-nr is the queue number of said queue and its next-element contains the nil value.

Further, a Remove operation will be described during which a particular request is removed from a queue. A remove triggers an action in that particular unit, which points with its next-element to the element to be removed. The remove is accomplished by loading said next-element pointer with the next-element pointer of the element to get removed.

When multiple concurrent Adds have to take place a priority scheme has to be applied for the case, that multiple adds are for the same queue at the same time. The element with the least priority will initialize itself, as described above, whereas the next-element pointers of the other elements to be added will be set to point to that element to be added, which has the next lower priority assigned. These next-pointers can be prepared in a cycle prior to the actual Add. In contrast to multiple removes which are described down below the current situation of a queue needs not to be reflected when constituting the plurality of elements to be added concurrently.

The remove process, as described above has the consequence, that each element must have a multiplexer to be able to access the next-element pointer of all other queue-elements, Thus, the amount of connections would grow exponentially with the number of supported elements. With multiple removes, this problem becomes even worse.

Some great profit can be taken in this situation of multiple removes from an advantageous feature of the present invention which takes advantage from the fact, that in most cases the element number of the element which is to be removed is known already in the clock cycle before the actual remove takes place. If this is not the case, the remove command can be delayed by 1 cycle to create this condition.

To achieve that a particular separate remove circuitry, further referred to as remove channel is added one per concurrent remove to be supported.

This circuitry will be provided with the element number, which will potentially get removed in the next cycle. The circuitry will access the latch input of the next-element pointer of that element and latch it centrally. With that circuitry the next-element pointer of each element to get removed can be supplied to all units out of a latch.

For multiple removes, the units have to check if the next element after one remove has been applied is also subject of another remove. In this case this subsequent remove has to be applied as-well with said remove channel. In some cases, a Move operation instead of an Add may be necessary.

It is assumed a special case in which a requester is allowed only one request at a time. However in the case of a time-out it must be allowed to retry the previous or a new command; even to a different resource, without causing damage to the integrity of the queue.

In such a case a move instead of a simple add has to be used. This move is achieved by concurrently issuing an Add and a Remove as described above.

The advantage of this implementation is that the amount of hardware needed for n elements grows linear with n and is independent from the number of queues m. The same is true for the queues: The amount of hardware needed for m queues grows linear with m and is independent from the number of elements n. Especially the implementation for the remove allows for short cycle times while still maintaining multiple concurrent removes.

With general reference to the Figures and with special reference now to FIG. 1 the general situation is depicted in which a circuit representing the inventional hardware implementation according to the present invention manages a plurality of queues 0, 1, 2, . . . m each connecting to a resource.

In the general case p requesters 101 are each allowed to have q requests outstanding. Thus, a total number of p×q outstanding requests 115 can exist, in a case in which q is fixed for all requesters 101.

Each of the requests is associated with one of m targets, i.e. resources 120, which may be busy such that m queues for n requests are required.

Figure 2:
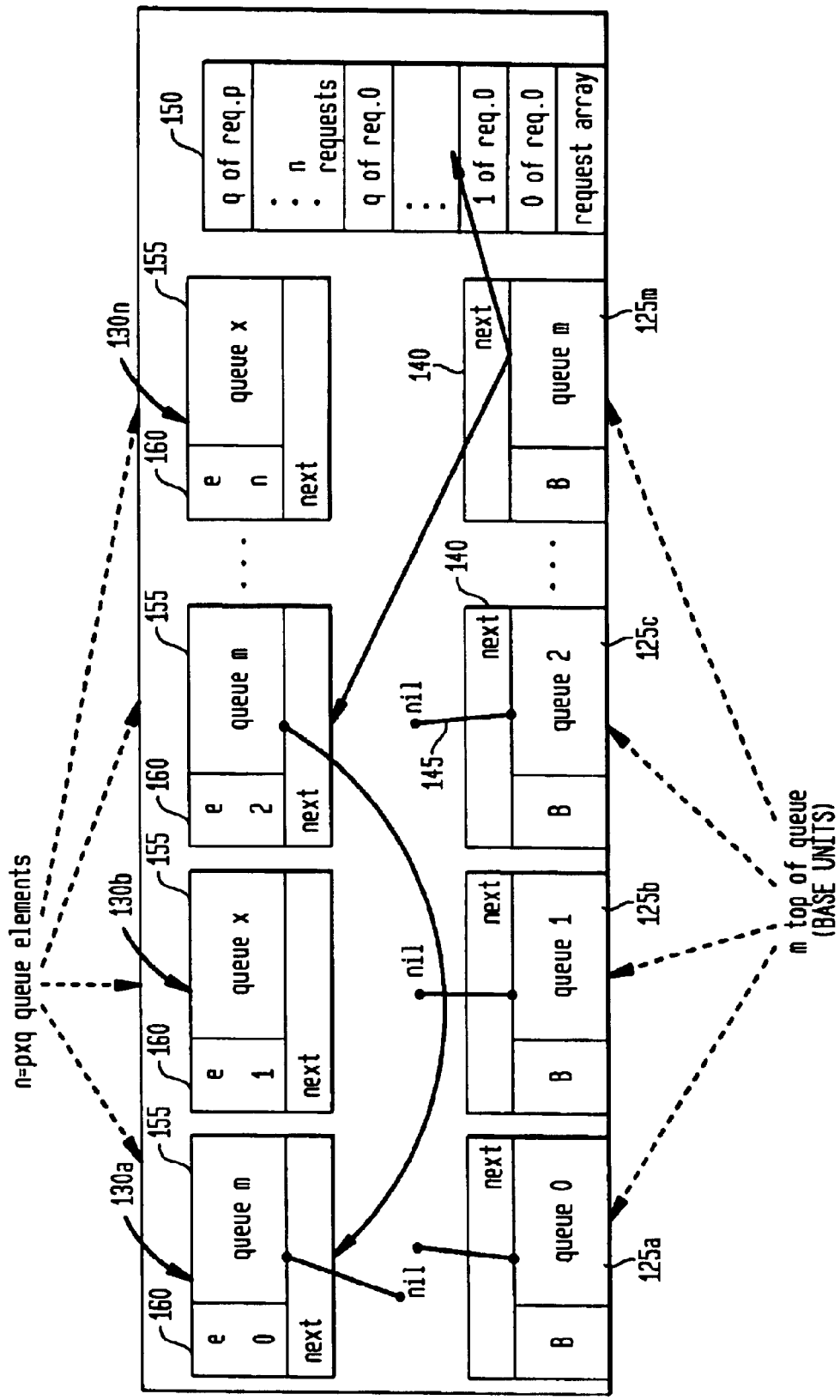

With reference now to FIG. 2 a schematic block diagram of a hardware implementation of a circuit according to the present invention is described in more detail in order to solve the queue management problem sketched out in FIG. 1 under the constraint that each requester may have only one request outstanding at a time.

M QueueBase units 125a, 125b, . . . , 125m denoted as B and depicted in the bottom part of the drawing represent m queues for accessing the m resources 120. Further, n QueueElement units 130a, 130b, . . . , 130n denoted as e and depicted in the top part of the drawing represent n queued requests.

Each of said units 125a, 125b, . . . , 125m is provided with a next pointer 140 denoted as 'next' having a binary representation representing the position in a central request array 150. The next pointer 140 points to the request array 150 and to a QueueElement unit 130a, 130b, . . . , 130n, or it contains nil as an indication 145 of the end of a particular queue.

The QueueBase units have fixed queue numbers which are binary representations of the queues, i.e. the resources.

The QueueElement units 130a, 130b, . . . , 130n can be provided with variable queue numbers 155 and fixed element numbers 160. In other words, one and the same QueueElement 130a, 130b, . . . , 130n can be associated with queue number 3 at one instant, and in a future instant it can be associated with queue number 7. The connection between an element and its successor is achieved with common pointer techniques.

Thus, the notation: QueueBase.next=nil means that the queue belonging to that QueueBase is empty. QueueBase.next !=nil means that the queue is active and QueueBase.next is the request to be dequeued next. In FIG. 2 queue number m contains element number 2 and element number 0.

As an advantage of the present invention no central logic is required for managing the queue situation depicted in FIG. 2. Instead, the queue is executed in parallel. The hardware effort to realize this is linear to the expression (number of requests+number of queues). In prior art, however a software program manages the queues where it is necessary to process subsequently all elements forming part of the underlying chain list.

With reference now to FIGS. 3A to 3E which are basically structured like FIG. 2 an example is given where basic operations on requests are described.

In FIG. 3A the starting point is depicted. Nothing is queued, yet, thus all next pointer connect to nil.

In FIG. 3B request number 2 is added to queue m. This is announced by the signals do-add, request-nr-to-add=2, queue-to-add-to=m. Those signals are available to all units.

According to the invention two actions are triggered. First, QueueBase m sees the match of queue-to-add-to and its own queue number and sees, that its next pointer is nil. This causes an update to its next pointer with request-nr-to-add=2. FIG. 3F is a flow chart depicting the general case where a first step 10 is the evaluation of a QueueBase's next pointer status i.e., determination of whether a next pointer is nil, that is performed concurrently in a base queue unit or QueueElement after having been added to a queue. If the base or queue element is the tail of the queue, then at step 12, a determination is made as to whether an add request is being made to that queue. If an add request is being made to that queue, then at step 14, the next pointer is set equal to the request-nr-to-add. That is, the next pointer now points to the queue element that represents this request.

Secondly, QueueElement 2 sees a match of request-nr-to-add and its own element-nr. This causes the QueueElement 2 to initialize itself. Its next pointer is set to nil, its queue number is m. QueueElement number 2 is now the new end of queue m. FIG. 3G is a flow chart depicting the general case concurrently performed in each queue element where a first step 50 is the determination of whether an add request is for that QueueElement. If yes, then the next pointer for that queue element is set to nil at step 60, thus setting itself as the tail of the queue. Finally, at step 70, the queue element remembers its queue number from the time of its addition to the queue. The queue number is fixed for the base unit.

Figure 3C:
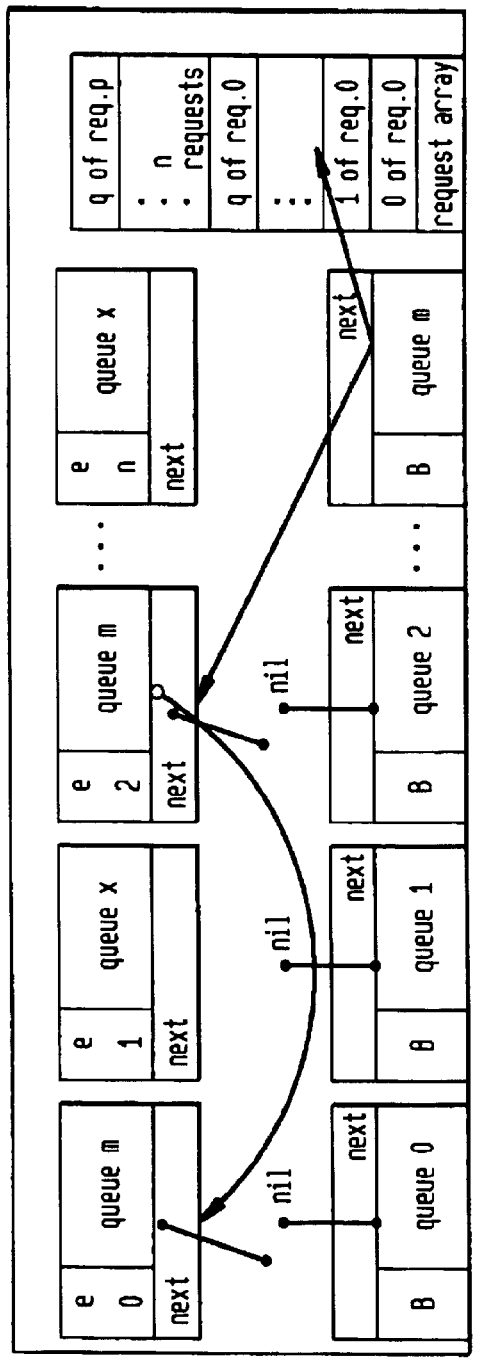

With reference now to FIG. 3C request 0 is added to queue m. This is announced by the signals do-add, request-nr-to-add=2, queue-to-add-to=m. Here, again two actions are triggered.

QueueElement 2 sees the match of queue-to-add-to and its queue number. Its next pointer is nil. This causes an update to its next pointer with request-nr-to-add=0.

Further, QueueElement 0 sees a match of request-nr-to-add and its element-nr. This causes QueueElement 0 to initialize itself. Thus, its next pointer is nil and it belongs to queue m. QueueElement 0 is now the new end of queue m.

Figure 3D:
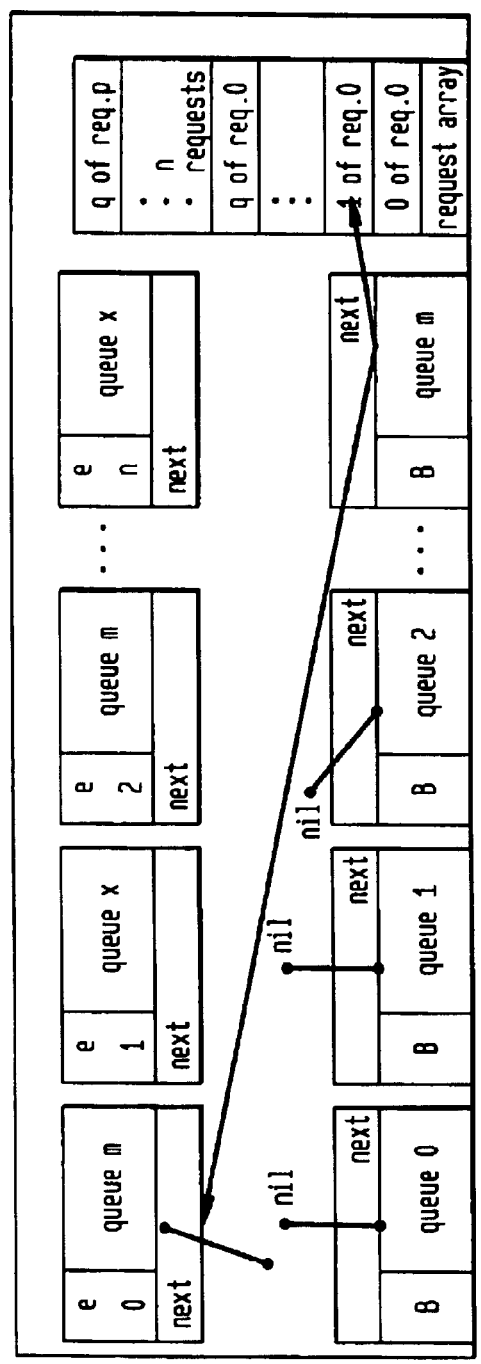

With reference now to FIG. 3D an example is given where request 2 is dequeued. This is announced by the signals do-remove, request-to-remove=2, and the signals are again available to all units.

Figure 3E:
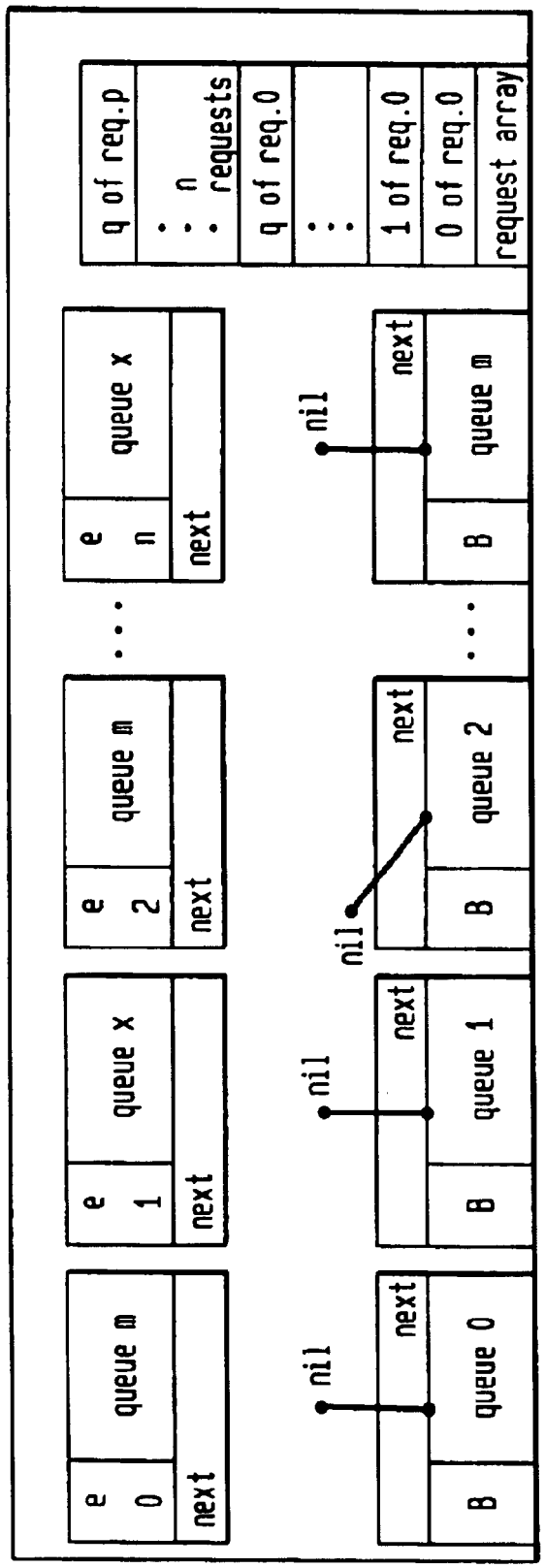
Figure 3G:
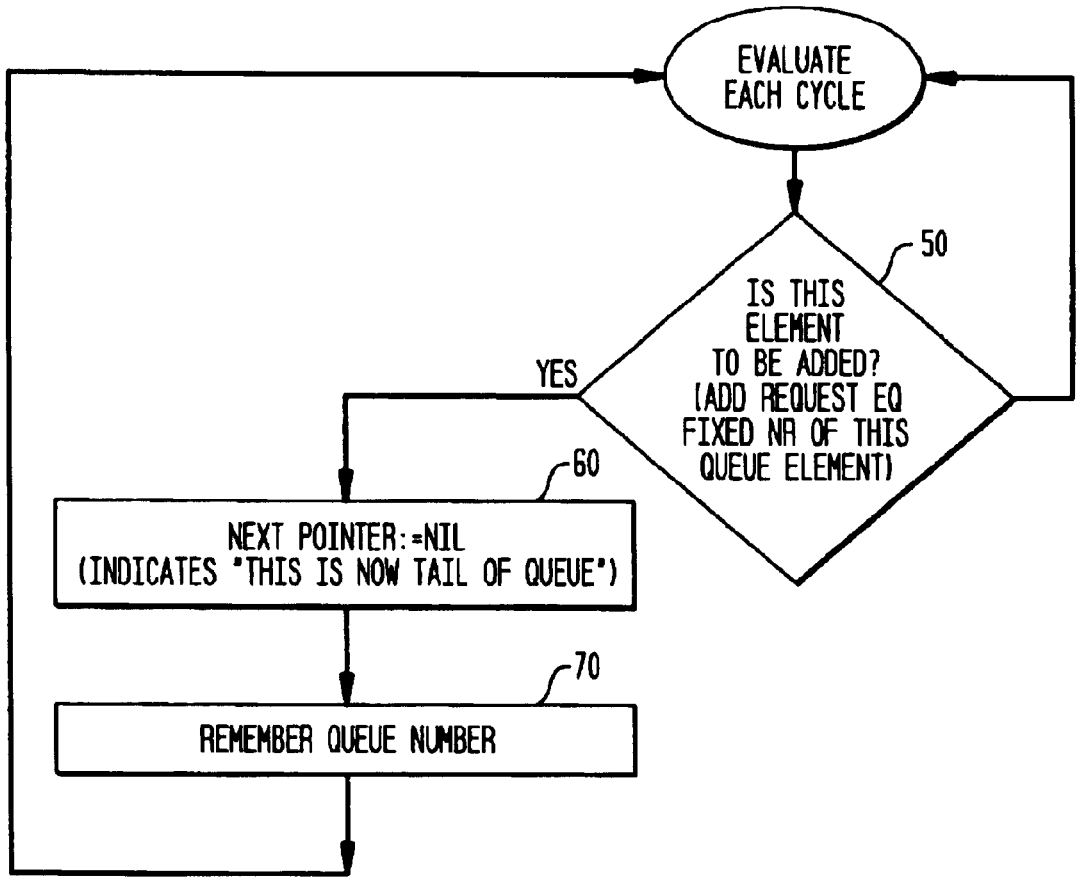
FIG. 3G is a flow chart depicting the functionality for adding a request to a queue element that is performed in each cycle and concurrently running in each queue element.

Only one action is triggered:

QueueBase m sees the match of request-to-remove and its own next pointer. This causes it to inherit the next pointer of QueueElement 2 which is 1. The same can happen in a QueueElement. A remove can happen, e.g., in case of a retry, when a request is in the middle of the queue. With reference now to FIG. 3E an example is given where request 0 is dequeued. This is announced again by signal do-remove, request-to-remove=0, which are again available to all units. Only one action is triggered:

QueueBase m sees the match of request-to-remove and its next pointer. This causes it to inherit the next pointer of QueueElement 0 which is nil. FIG. 3F further depicts the functionality for updating a next pointer status for a base unit or each queue element after having been added to a particular queue for the general case of dequeing a request held in a particular queue. If at first step 10 it is determined that the request to be dequeued is not at the tail of the queue (i.e., next pointer is not equal to nil) then, a determination is made at step 15 as to whether the remove request is for that particular element. If it is then the process proceeds to step 18, where the action of loading the next-element pointer with the next-element pointer of the element to get removed is triggered.

For small values of m, n and q the way described in conjunction with FIGS. 3A to 3E can be performed. With increasing values of these parameters, however, a problem arises: on a remove the current next pointer has to be compared with the request-to-remove. On a match the next pointer of the element to be removed is inherited. The solution depicted in FIGS. 3A to 3E has the problem that the number of lines connecting all elements with each other grow in an exponential way with the number of elements. With large values of the parameters mentioned above this situation can not be tolerated anymore.

Secondly, a second question is of some relevance for a good performance of queue management:

The question is 'is the element next to the element to get removed although to get removed?' This question needs to get answered, and if it is answered with 'yes' an action 'take over next to next' is not possible to get answered quickly when implemented in hardware because such an implementation requires at least two cascaded multiplexers.

Thus, a preferred embodiment of the inventional hardware implementation providing a solution of this problem is described in more detail with reference to FIG. 4 which is a schematic representation only.

Figure 4:
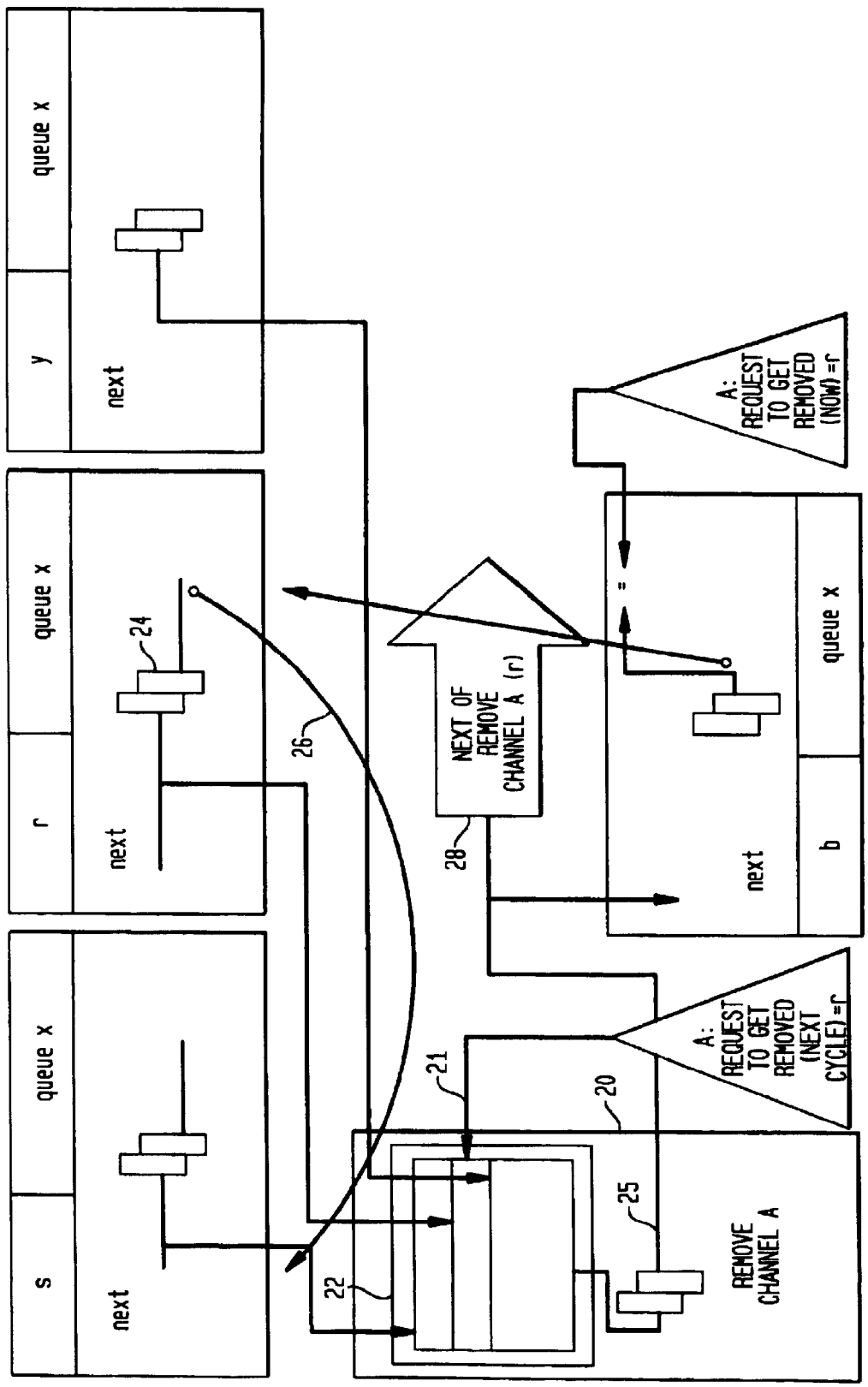
FIG. 4 is a schematic block diagram showing an advantageous feature of so-called remove channels according to the present invention.

In FIG. 4 registers are generally depicted as two vertical rectangles, exemplarily to be interpreted as master-slave registers.

There are introduced so-called remove channels which serve to handle concurrent removes. This remove channels act as a pipeline stage for the remove. For each concurrent remove, i.e., set of remove parameters such a remove channel is provided. This means, for two concurrent removes two remove channels are provided, and for three concurrent removes, three remove channels are provided, For i concurrent removes, i remove channels must be provided.

FIG. 4, for simplicity, shows only one of such remove channels named "remove channel A" 20. In this example queue element r of a queue x is to be removed. Other queue elements of the same queue are depicted as elements s and y in the upper portion of the drawing. The queue base element of queue x is depicted in the bottom part and is denoted as b.

The parameter "request to get removed" of remove channel A which is r in this example is applied to the control input 21 of a multiplexer 22 associated with the remove channel A one cycle before the actual remove takes place, see the left side triangle in FIG. 4. This multiplexer selects the input to the next-pointer register 24 of the queue-element to be removed as an input to the register within the remove channel, which is s in this example. Then 1 cycle later, in the cycle when the actual remove takes place, the register output 25 of the remove channel A holds a copy of the next pointer of the queue-element to get removed which is s in this example, see the arc 26. This result is distributed as "next of remove channel A", see thick arrow 28 to all queue elements left in said queue x and is used to lower the complexity of the next pointer logic in the queue elements and to speed it up.

The next pointer logic in the queue element—which is queue-base b in this example—compares its next pointer value to the parameter "request to get removed" of remove channel A. The compare is depicted as positive, i.e., the values compared are equal, and now, with one remove channel only, the next-element register of the queue element is loaded with the "next of remove channel A" signal directly; which is a copy of the next-pointer of the element to get removed.

In the case of multiple concurrent removes (not shown in FIG. 4) there is a separate remove channel for each possible concurrent remove. In such a case it has to be checked if the next pointer value of a queue element points to an element, that is to be removed by any of the remove channels.

If this is not the case, then the next pointer of the queue element remains unchanged if the element in question is not added to any queue in this cycle.

If the next pointer value points to an element that is to be removed by a certain remove channel, then, in a recursive way, the "next of remove channel" of the remove channel in question has to be checked for pointing to an element, that is to be removed by any remove channel not involved so far, until all channels have been checked, or the "next of remove channel" is not to be removed by any of the remove channels not involved so far.

For example, for two remove channels A and B in the case of two concurrent removes the logic would be:

if element is not added
  then if next pointer of queue element points to element that is to be removed by remove channel A
    then if "next of remove channel A" points to element that is to be removed by remove channel B,
      then use "next of remove channel B" as next pointer
      else use "next of remove channel A" as next pointer
    else if next pointer of queue element points to element that is to be removed by remove channel B
      then if "next of remove channel B" points to element, that is to be removed by remove channel A
        then use "next of remove channel A" as next pointer
        else use "next of remove channel B" as next pointer
  else keep next pointer According to this principle multiple concurrent removes are possible even if strong speed requirements are present.

While the invention has been particularly shown and described with respect to preferred embodiments thereof, it will be understood by those skilled in the art that the foregoing and other changes in form and details may be made therein without departing form the spirit and scope of the invention.

Having thus described my invention, what I claim as new, and desire to secure by Letters Patent is:

1. An electronic Queue management system usable in electronic systems comprising:

means for receiving n possible requests sent by p requestors, said requests being queueable to m resources, means for implementing m queue base units, each base unit being associated with a respective resource and representing a top of a fixed queue for that resource;

means for implementing n queue elements, each freely associable for forming a queue for a resource, each of said n queue elements capable of being associated with a request, each request being associated with either a queue base unit or a queue element, and each queue base unit and queue element having a pointer means for pointing to a next-queue element each time a request is added to a queue formed for a resource; and add-request and remove-request input line means accessible by each queue base unit or a queue element for handling multiple concurrent requests including the addition of a request to be placed in a queue, and concurrent removal of a queued request in a single cycle;

wherein said base units are associable with a next-queue element representing a request, said next-queue element being encoded to be associated with one of said next-queue elements, whereby said queue management system performs without centralized controller logic.

2. The system according to claim 1, comprising an array arranged for receiving commands and data associated with each requests, and each of said requests being associated with a binary number representing address information for accessing said request in said array.

3. The system according to claim 2, further comprising:

a remove channel for handling concurrent remove-request operations from a queue, said remove channel comprising a multiplexer means for providing the next-queue element pointer of a queue element to be removed during a remove-request operation in an operating cycle, and a register means having an output for providing said next-queue element pointer at its output in order to check in the same cycle if the queue element being associated with said next-queue element pointer is also to be removed.

4. The system according to claim 3, further comprising an arrangement of multiple, independently operating remove channels, each remove channel supplying the value of the next-queue element pointer associated with the subsequent element in the queue which may be additionally removed by any remaining remove channel.

5. The system according to claim 1 comprising an arrangement for performing multiple Adds in which arrangement all next-pointers associated with a respective element to be added can be computed in a separate step prior to the actual Add.

6. A computer implementing an integrated circuit comprising an electronic queue management system, said queue management system comprising:

means for receiving n possible requests sent by p requestors, said requests being queueable to m resources, means for implementing m queue base units, each base unit being associated with a respective resource and representing a top of a fixed queue for that resource;

means for implementing n queue elements, each freely associable for forming a queue for a resource, each of said n queue elements capable of being associated with one of said n possible requests, each request being associated with either a queue base unit or a queue element, and each queue base unit and queue element having a pointer means for pointing to a next-queue element within the queue associated with a respective resource; and add-request and remove-request input line means accessible by each queue base unit or a queue element for handling multiple concurrent requests including the addition of a request to be placed in a queue, and concurrent removal of a queued request in a single cycle;

wherein said base units are associable with a next-queue element representing a request, said next-queue element being encoded to be associated with one of said next-queue elements, whereby said queue management system performs without centralized controller logic.

7. An electronic circuit implemented on a chip comprising a queue management system, said queue management system comprising:

means for receiving n possible requests sent by p requestors, said requests being queueable to m resources, means for implementing m queue base units, each base unit being associated with a respective resource and representing a top of a fixed queue for that resource;

means for implementing n queue elements, each freely associable for forming a queue for a resource, each of said n queue elements capable of being associated with one of said n possible requests, each request being associated with either a queue base unit or a queue element, and each queue base unit and queue element having a pointer means for pointing to a next-queue element within the queue associated with a respective resource; and add-request and remove-request input line means accessible by each queue base unit or a queue element for handling multiple concurrent requests including the addition of a request to be placed in a queue, and concurrent removal of a queued request in a single cycle;

wherein said base units are associable with a next-queue element representing a request, said next queue element being encoded to be associated with one of said next-queue elements, whereby said queue management system performs without centralized controller logic.

8. A method for distributed queue management usable in electronic systems, said method comprising the steps of:

a) receiving add and remove requests communicated by p requestors to be queued to m resources;

b) providing m queue base elements, each being associated with a top of a queue, each queue controlling a respective resource; and c) providing n queue elements, each of said queue elements capable of being associated with a received request; and, d) linking a queue base element with a next element representing a first received request to be added for a resource, and subsequently forming a queue of linked next elements starting at a respective queue base for all subsequent requests for that resource, e) enabling access to each queue base unit or a queue element for handling multiple concurrent requests including the addition of a request to be placed in a queue, and concurrent removal of a queued request in a single cycle;

wherein each queue element is autonomic and functions in parallel with the other queue elements, in a manner such that any queue base unit together with linked staid next queue elements form the associated queue, said queue management system performing without centralized controller logic.

* * * * *

UNITED STATES PATENT AND TRADEMARK OFFICE
CERTIFICATE OF CORRECTION

PATENT NO. : 6,757,679 B1
DATED : June 29, 2004
INVENTOR(S) : Rolf Fritz et al.

It is certified that error appears in the above-identified patent and that said Letters Patent is hereby corrected as shown below:

Column 10,
Line 5, "next queue" should read -- next-queue --
Line 33, "staid" should read -- said --

Signed and Sealed this

Eleventh Day of January, 2005

JON W. DUDAS
*Director of the United States Patent and Trademark Office*